United States Patent
Ichimura

(10) Patent No.: US 7,940,255 B2
(45) Date of Patent: May 10, 2011

(54) INFORMATION PROCESSING DEVICE WITH INTEGRATED PRIVACY FILTER

(75) Inventor: Tetsunari Ichimura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1154 days.

(21) Appl. No.: 11/493,977

(22) Filed: Jul. 26, 2006

(65) Prior Publication Data
US 2007/0124705 A1  May 31, 2007

(30) Foreign Application Priority Data
Jul. 29, 2005 (JP) ................................ 2005-221057

(51) Int. Cl.
*G06F 3/038* (2006.01)
(52) U.S. Cl. .......................................... 345/204; 345/32
(58) Field of Classification Search .................... 345/204
See application file for complete search history.

(56) References Cited

U.S. PATENT DOCUMENTS

| | | | | |
|---|---|---|---|---|
| 5,093,654 | A * | 3/1992 | Swift et al. ........................ | 345/76 |
| 6,445,434 | B2 * | 9/2002 | Takato et al. ................. | 349/123 |
| 2004/0085297 | A1 * | 5/2004 | Stivers et al. ................. | 345/168 |
| 2004/0207594 | A1 | 10/2004 | Kubo | |
| 2005/0071702 | A1 | 3/2005 | Morisawa | |
| 2005/0112343 | A1 * | 5/2005 | MacMaster ................... | 428/212 |
| 2005/0212720 | A1 * | 9/2005 | Rothman et al. .................. | 345/8 |

FOREIGN PATENT DOCUMENTS

| | | |
|---|---|---|
| CN | 1534338 A | 9/2009 |
| JP | 10-153968 | 6/1998 |
| JP | 2004-062094 | 2/2004 |
| JP | 2004-133334 | 4/2004 |
| JP | 2006-215116 | 8/2006 |
| WO | WO 2005019919 A1 * | 3/2005 |

OTHER PUBLICATIONS

Japanese Patent Application No. 2005-221057 Office Action dated Oct. 14, 2008. (English Translation).
Chinese Patent Application No. 2006101090782 Office Action dated Jun. 19, 2009. (English Translation).

* cited by examiner

*Primary Examiner* — Alexander Eisen
*Assistant Examiner* — Andrew Schnirel
(74) *Attorney, Agent, or Firm* — Blakely, Sokoloff, Taylor & Zafman LLP

(57) ABSTRACT

According to one embodiment, an information processing device includes a display panel, a filter arranged to face one surface of the display panel and driven by a drive signal, a drive unit configured to supply the drive signal to the filter a detecting unit which detects a start and an end of an application, and a control unit which ON/OFF-controls the filter depending on a detection result of the detecting unit.

12 Claims, 10 Drawing Sheets

INFORMATION PROCESSING DEVICE WITH INTEGRATED PRIVACY FILTER

CROSS-REFERENCE TO RELATED APPLICATIONS

This application is based upon and claims the benefit of priority from Japanese Patent Application No. 2005-221057, filed Jul. 29, 2005, the entire contents of which are incorporated herein by reference.

BACKGROUND

1. Field

The present invention relates to an information processing device including a privacy filter which makes it difficult to peep at the information processing device.

2. Description of the Related Art

In recent years, a liquid crystal display device is popularly used as a display device for a notebook computer, a monitor, or the like. An improvement in viewing-angle dependency of the liquid crystal display device advances. The liquid crystal display has a viewing angle at a level equal to that of a CRT.

A display which can be viewed from the front and cannot be easily viewed obliquely is required for an application of, for example, a mobile terminal or the like. This is to prevent information from being viewed by a person except for a user located in front of the display when the user creates or reads a confidential document or the like in a public area or the like. Furthermore, the user uses the display to read or write a private email or the like without paying attention to people around her/him.

As a technique of controlling a viewing angle, a technique using a liquid crystal panel (to be referred to as a privacy filter) is disclosed (Jpn. Pat. Appln. KOKAI Publication No. 2004-13334). In the technique described in the document, when a privacy filter is turned on, an interference pattern can be obliquely viewed to protect information such as a document on a screen, allowing a user to view the information in front of the screen. Even though the privacy filter is turned off, an image display panel to display an image can be viewed at an original viewing angle.

BRIEF DESCRIPTION OF THE SEVERAL VIEWS OF THE DRAWING

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing device comprises a display panel, a filter arranged to face one surface of the display panel and driven by a drive signal, a drive unit configured to supply the drive signal to the filter a detecting unit which detects a start and an end of an application, and a control unit which ON/OFF-controls the filter depending on a detection result of the detecting unit.

Figure 1:
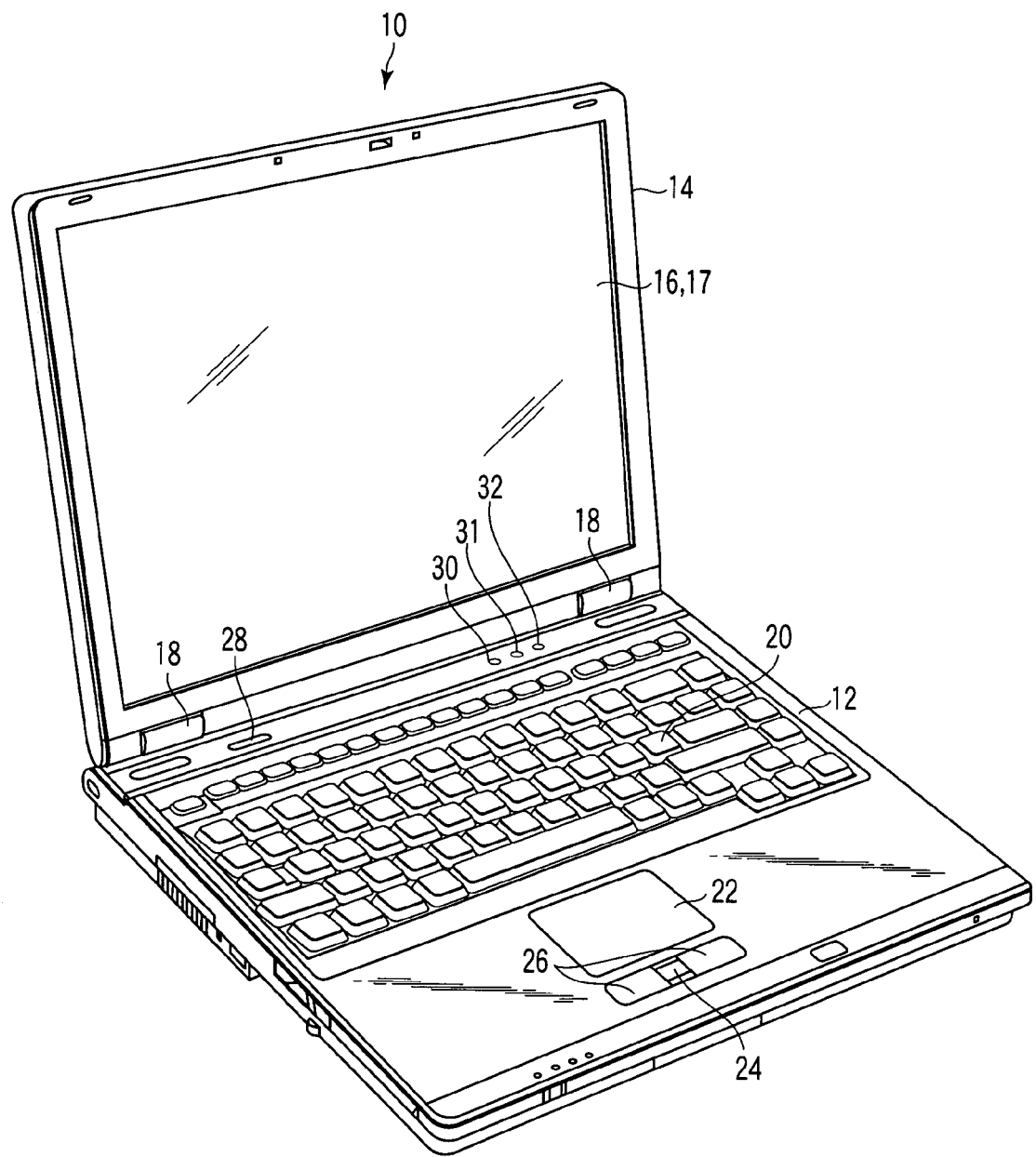
FIG. 1 is an exemplary perspective view showing an example of a schematic configuration of a personal computer according to a first embodiment of the present invention.

FIG. 1 is a diagram showing an example of a configuration of a notebook personal computer serving as an information processing device according to a first embodiment of the present invention.

A personal computer 10 is configured of a body 12 and a display unit 14. In the display unit 14, a liquid crystal display (LCD) 16 serving as a display panel and a privacy filter 17 are incorporated.

Figure 2:
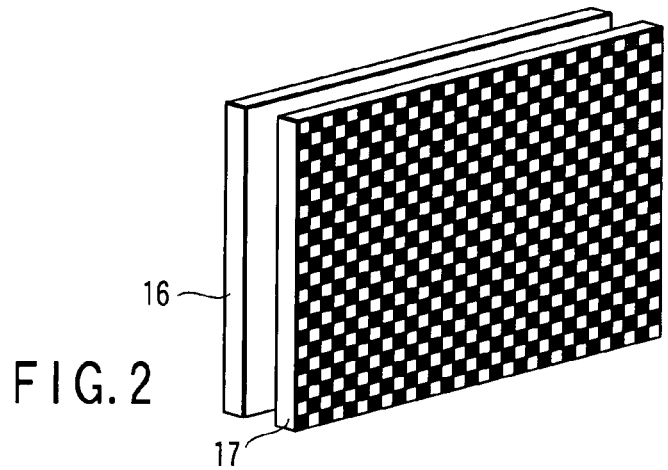
FIG. 2 is an exemplary diagram showing an example of an arrangement relationship of an LCD and a privacy filter according to the first embodiment.

As shown in FIG. 2, the privacy filter 17 is attached on an image display screen of the LCD 16. The privacy filter 17 may be attached to a surface opposing an image display surface of the LCD 16. The privacy filter 17 can also be used by attaching on a display such as an organic EL panel having a polarizing plate arranged thereon.

The display unit 14 serving as a display unit is fixed to a hinge (support portion) 18 arranged on an end portion on a back side of the body 12 such that the display unit 14 can be freely pivoted between an opening position where the display unit 14 covers an upper surface of the body 12 and a closing position where the upper surface of the body 12 is exposed.

The body 12 has a thin-box-like housing. A keyboard 20 is arranged at a central portion on the upper surface of the housing. A palm rest is formed on the upper surface of the housing on the front side of the body 12. At a nearly central portion of the palm rest, a touch pad 22, a scroll button 24, and touch pad control button 26 are arranged. On the upper surface of the housing on the back side of the body 12, a power button 28 to turn on/off a power source of the body 12, a privacy filter button 30, contrast-increase button 31 and a contrast-decrease button 32 are arranged.

Figure 3A:
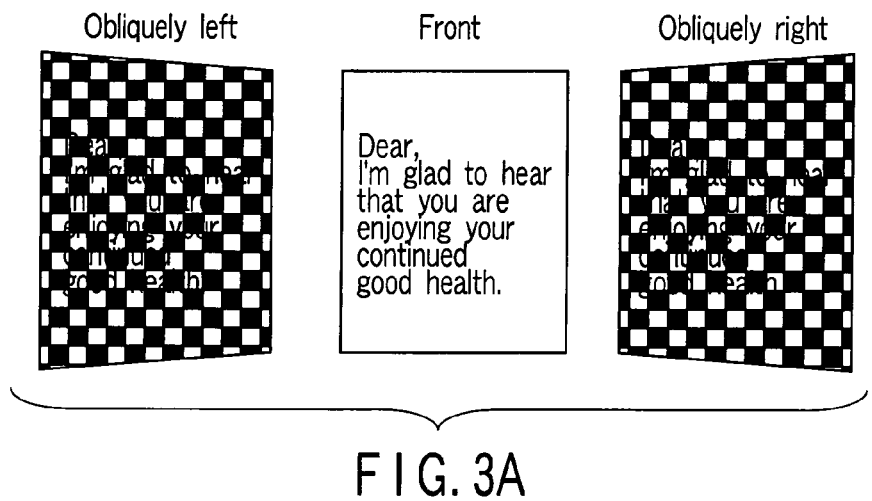
FIG. 3A and FIG. 3B are exemplary diagrams explaining an example of viewing angle control performed by the privacy filter.
Figure 3B:
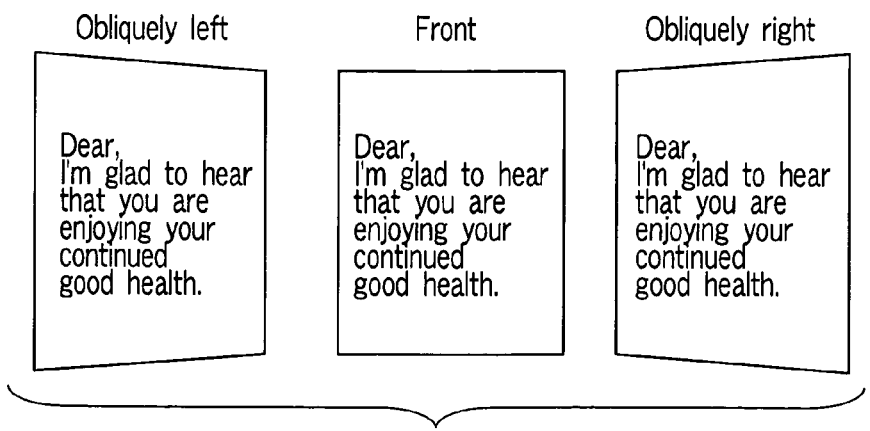

FIGS. 3A and 3B show an example of views of screens when the privacy filter 17 is attached on the LCD 16. Three screens in FIG. 3A show a state obtained when a power is applied to the privacy filter 17. Three screens in FIG. 3B shows a state obtained when no power is applied to the privacy filter 17. The left images are obtained when the screen is obliquely viewed from the left side of the screen, the center images are obtained when the screen is viewed in front of the screen, and the right images are obtained when the screen is obliquely viewed from the right side of the screen.

As described above, in a voltage-unapplied state (FIG. 3B), even though the screen is viewed in front of the screen or obliquely viewed from the left and right sides of the screen, these resultant images are not different from a normal display image at all.

On the other hand, in a voltage-applied state (FIG. 3A), when the screen is viewed in front of the screen, the resultant image is not different from a normal display image at all. However, the screen is obliquely viewed from the left or right side of the screen, black parts are formed depending on regions arranged on an alignment film to block the display of the liquid crystal display device. Such a block pattern is displayed to make it difficult to recognize the screen in an obliquely lateral direction and to prevent the screen from being peeped.

An example of a system configuration of the computer will be described below with reference to FIG. 4.

Figure 4:
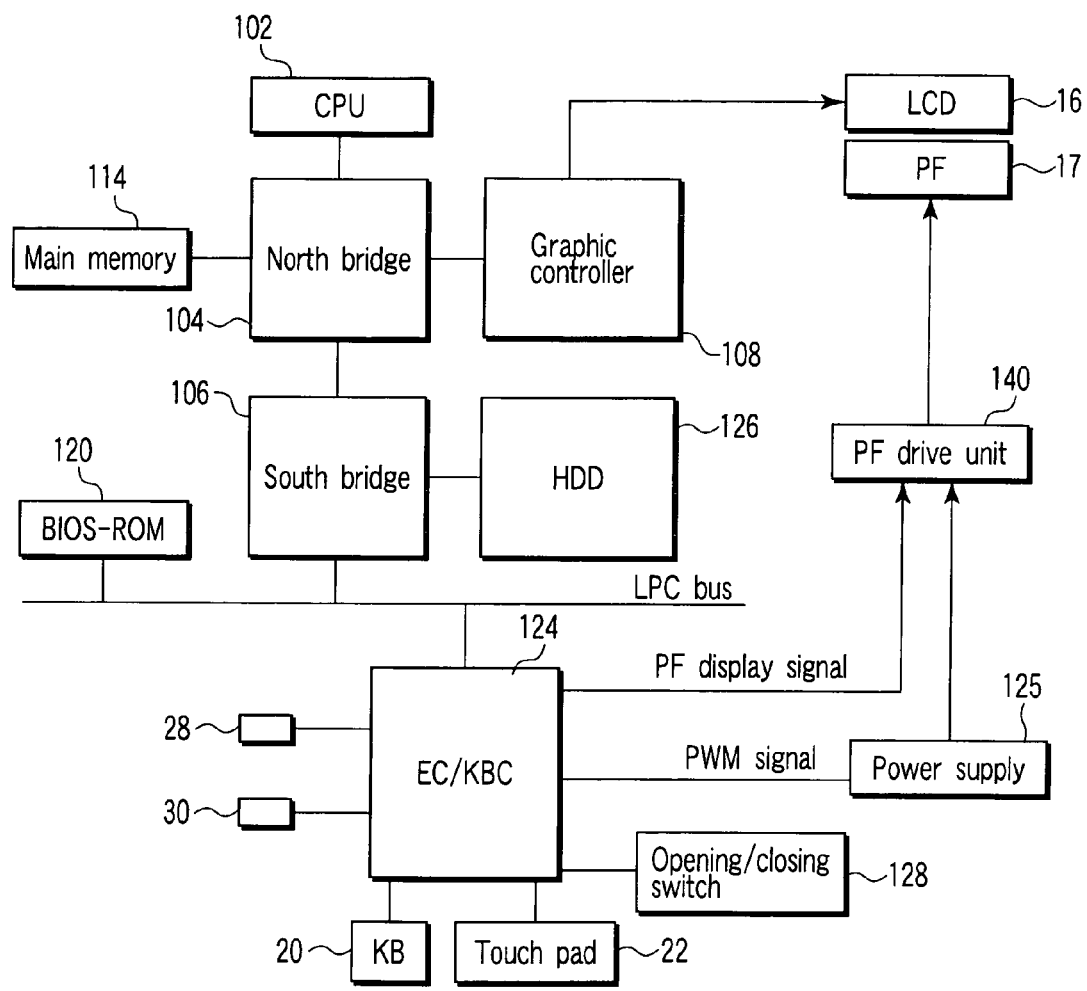
FIG. 4 is an exemplary block diagram showing an example of a circuit configuration of a personal computer according to the first embodiment.

The computer, as shown in FIG. 4, includes a CPU 102, a north bridge 104, a main memory 114, a graphic controller 108, a south bridge 106, a BIOS-ROM 120, a hard disk drive (HDD) 126, an embedded controller/keyboard controller IC (EC/KBC) 124, a power supply 125, and the like.

The CPU 102 is a processor arranged to control an operation of the computer. The CPU 102 executes various application programs including an operating system (OS) and a screen saver execution program loaded from the hard disk drive (HDD) 126 onto the main memory 114.

A screen saver processing program is stored in the hard disk drive (HDD) 126. The screen saver processing program displays a screen saver on the LCD 16 by a designation from the operating system.

The CPU 102 loads a basic input output system (system BIOS) stored in the BIOS-ROM 120 on the main memory 114 and then executes the system BIOS. The system BIOS is a program for hardware control.

The north bridge 104 is a bridge device which connects a local bus of the CPU 102 to the south bridge 106. In the north bridge 104, a memory controller which access-controls the main memory 114 is also incorporated. The north bridge 104 also has a function of executing communication with the graphic controller 108 through an accelerated graphics port (AGP) bus or the like.

The graphic controller 108 is a display controller which controls the LCD 16 used as a display monitor of the computer. The graphic controller 108 has a video memory (VRAM) and generates a video signal which forms a display image to be displayed on the LCD 16 from display data drawn on the video memory by the OS/application program. The video signal generated by the graphic controller 108 is output to a line.

The embedded controller/keyboard controller IC (filter control unit) 124 controls the touch pad 22 serving the scroll button 24 and the touch pad control button 26 as an input unit and functions as a controller which controls the privacy filter 17. The embedded controller/keyboard controller IC 124 is a one-chip microcomputer which monitors and controls various devices (peripheral devices, sensors, a power source circuit, and the like) regardless of a system state of the personal computer 10.

The embedded controller/keyboard controller IC 124 serving as a signal value information supply unit supplies a PF display signal to a privacy filter drive unit 140 serving as a drive control unit in a power-ON state which is a drive start state of the LCD 16, and automatically supplies a PWM signal serving as signal value information to the power supply 125. The power supply 125 supplies a drive signal depending on the PWM signal to the privacy filter 17 to start drive of the privacy filter 17. As the drive start state of the LCD 16, in addition to the power-ON state, there is a state restored from a resume state. In the restoration state, the privacy filter 17 is automatically started to be driven.

As an opening/closing detecting unit to detect whether the display unit 14 is located at a closing position, an opening/closing switch 128 is arranged. A detection result of the opening/closing switch is supplied to the embedded controller/keyboard controller IC 124.

In the device, it can be set whether the privacy filter 17 can be automatically started when the device is started. In the device, when a screen saver is displayed on the LCD 16 by the screen saver processing program, the drive of the privacy filter 17 can be automatically stopped.

A configuration to control drive of the privacy filter 17 will be explained below with reference to FIG. 5.

Figure 5:
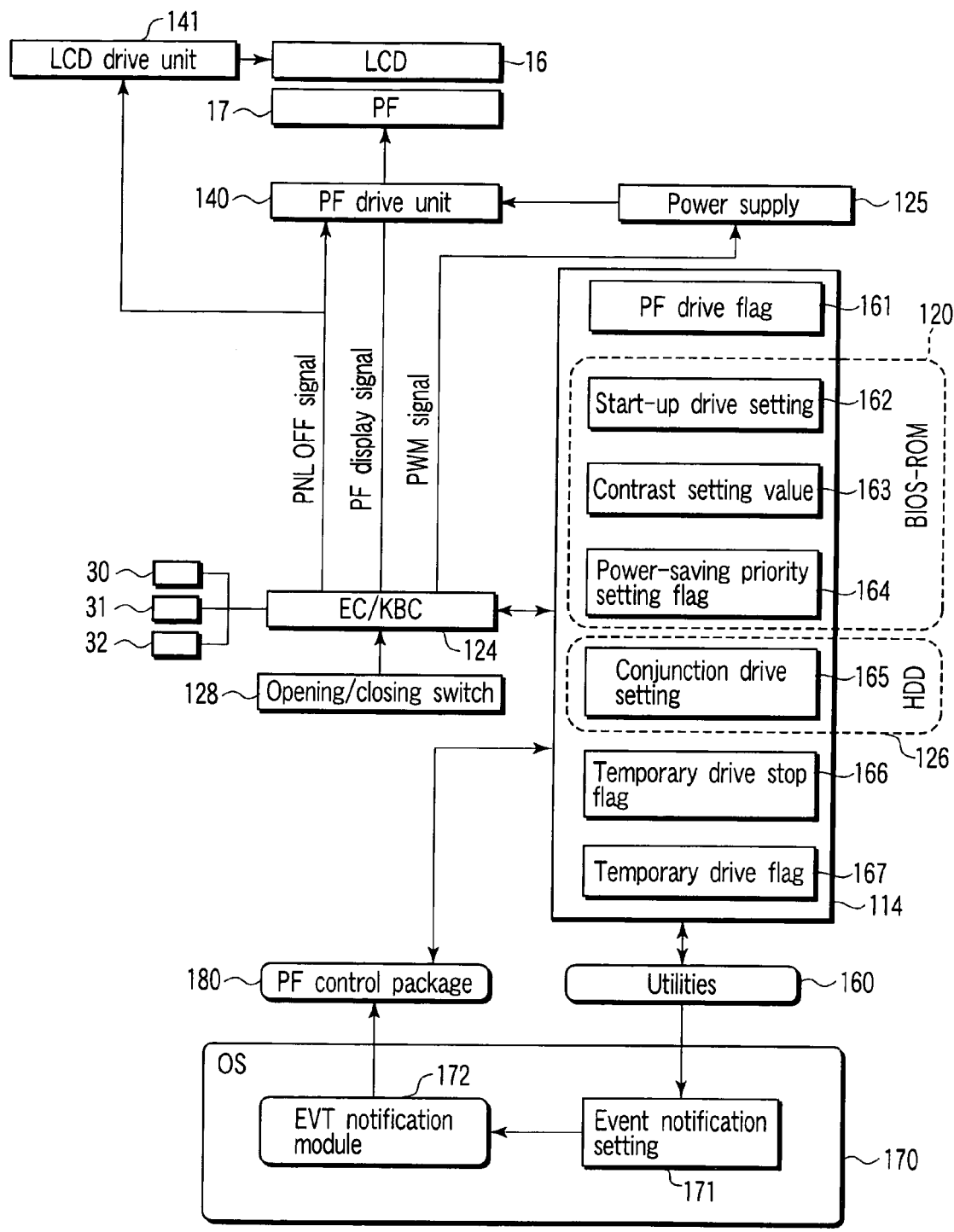
FIG. 5 is an exemplary block diagram showing an example of a configuration to drive the privacy filter.

As shown in FIG. 5, the privacy filter button 30 is operated to cause the EC/KBC 124 serving as a control unit to turn on/off a drive signal from the privacy filter drive unit 140 to the privacy filter 17. The embedded controller/keyboard controller IC 124 enables or disables a privacy filter drive flag 161 on the main memory 114 depending on a drive state of the privacy filter 17. An enable state is a state in which the privacy filter 17 is driven, and a disable state is a state in which the drive of the privacy filter 17 is stopped.

When the opening/closing switch 128 detects that the display unit 14 is located at the closing position, the embedded controller/keyboard controller IC 124 set a PNLOFF signal at "Hi", the signal being supplied to the privacy filter drive unit 140 and a LCD drive unit 141 to drive the LCD 16. When the PNLOFF signal goes to "Hi", the privacy filter drive unit 140 turns off the privacy filter, the LCD drive unit 141 turns off the display of the LCD.

When the privacy filter 17 is driven, one of a contrast-increase button 31 and a contrast-decrease button 32 is operated, the embedded controller/keyboard controller IC 124 commands the power supply 125 to increase or decrease a value of a drive signal by a PWM signal depending on a type of the buttons. An amount of light directing in a predetermined direction except for a nearly normal-line direction of the surface of the display panel can be controlled, and the contrast of the block pattern displayed on the privacy filter 17 can be changed. The contrast setting value 163 of the block pattern displayed on the privacy filter 17 is stored in the BIOS-ROM 120 serving as a contrast setting value storing unit.

Figure 6:
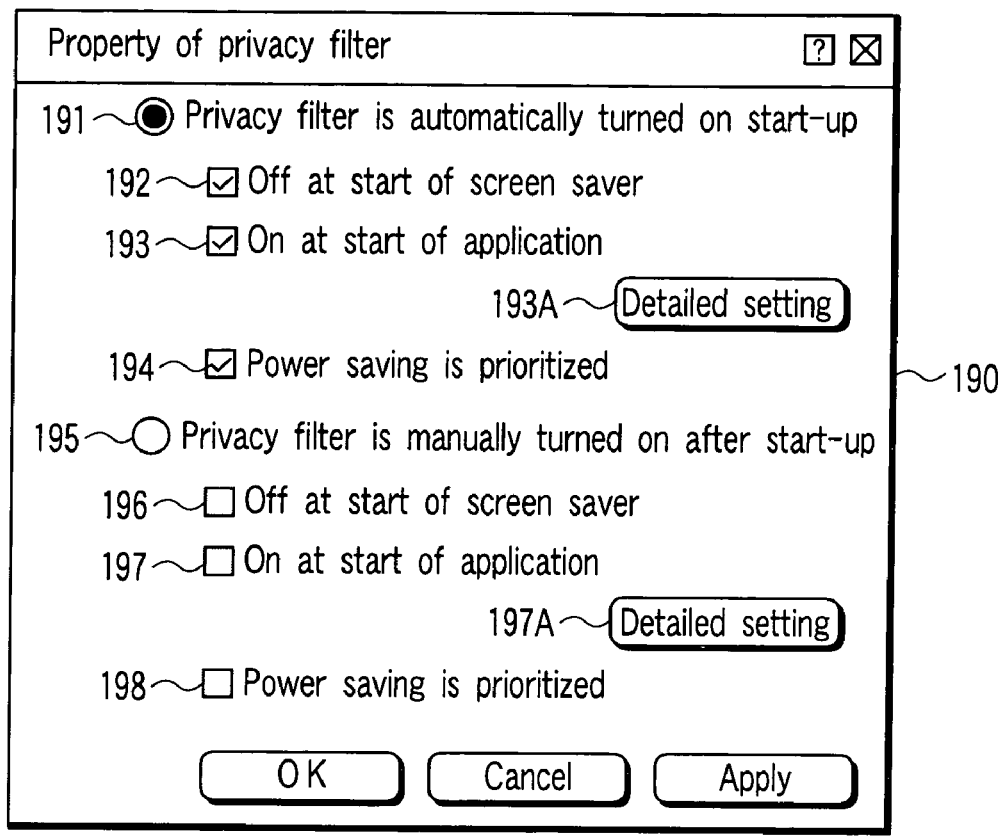
FIG. 6 is an exemplary diagram showing a window displayed on the LCD to set the privacy filter by utilities.

Utilities 160 operating on an operating system (OS) 170 serving as an authentication unit display a window 190 shown in FIG. 6 on the LCD 16. A radio box 191 to automatically set the privacy filter 17 at a start of the device and a radio box 195 to manually set the privacy filter 17 are arranged. The radio box 191 and the radio box 195 are exclusively selected. In a selection state of the radio box 191 and the radio box 195, when one of the radio box 191 and the radio box 195 is selected, the other one of the radio box 191 and the radio box 195 is automatically unchecked. A start-up drive setting 162 representing whether the privacy filter 17 is driven on start-up of the device is stored in the BIOS-ROM 120 serving as a start-up drive setting section.

Check boxes 192 to 194 are setting items used when the radio box 191 is selected. Check boxes 196 to 198 are setting items used when the radio box 195 is selected. The check boxes 192 and 196 are set to turn on the privacy filter 17 at a start of the screen saver. The check boxes 193 and 197 are set to turn off or on the privacy filter 17 in conjunction with a start of a predetermined application.

Figure 7:
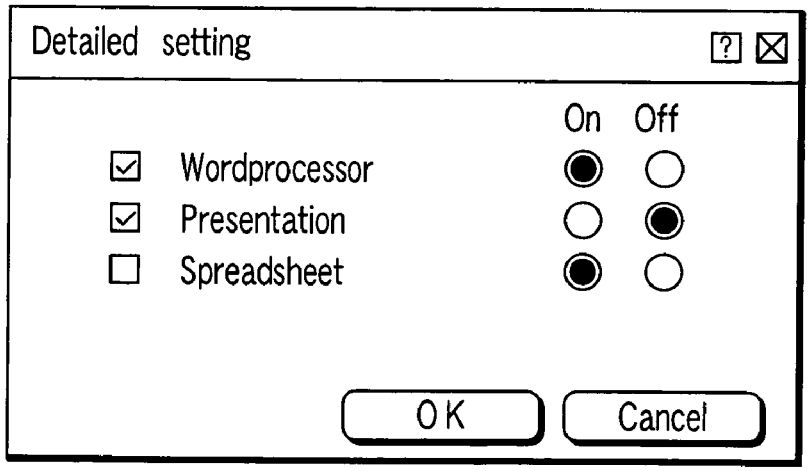
FIG. 7 is an exemplary diagram showing a window displayed on the LCD to set an application which performs drive control of the privacy filter.

When the check box 193 (or check box 197) is selected, the detailed setting button 193A (or the detailed setting button 197A) can be operated. When a user operates the detailed setting button 193A (or the detailed setting button 197A), a window shown in FIG. 7 is displayed on the LCD 16. As shown in FIG. 7, the privacy filter 17 can be automatically on/off-controlled every application stored in the hard disk drive (HDD) 126.

The check boxes 194 and 198 are set to set whether drive restoration time of the privacy filter 17 is prioritized when the privacy filter 17 is turned off in conjunction with a stop of drive of the screen saver or the application. In FIG. 7, it is selected that the privacy filter 17 is driven in conjunction with a start of a wordprocessor and a spreadsheet, and it is selected that drive control of the privacy filter 17 is not performed in conjunction with a start of the spreadsheet. The privacy filter 17 is set to be driven in conjunction with a start of the wordprocessor. The drive of the privacy filter 17 is set to be stopped in conjunction with a start of presentation.

A conjunction drive setting 165 to control drive of the privacy filter 17 operating in conjunction with a start of the screen saver and a start of the application is stored in a hard disk drive serving as a conjunction drive setting storing unit. When the drive of the privacy filter 17 is stopped in conjunction with a start of the screen saver and the application, and power saving is prioritized, utilities 160 enables a power-saving priority setting flag 164 stored in the BIOS-ROM 120 serving as a power-saving priority setting storing unit.

When the privacy filter 17 is driven in conjunction with a start of the screen saver or the application, a temporary drive stop flag 166 on the main memory 114 is enabled. When the drive of the privacy filter 17 is stopped in conjunction with the start of the screen saver or the application, a temporary drive flag 167 on the main memory 114 is enabled. The embedded controller/keyboard controller IC 124 periodically detects states of the temporary drive stop flag 166 and the temporary drive flag 167 to control an output of a PWM signal. More specifically, when the temporary drive stop flag 166 is disabled, the PWM signal can be output. When the temporary drive stop flag 166 is enabled, an output of the PWM signal can be stopped. When the temporary drive flag 167 is disabled, the output of the PWM can be stopped. When the temporary drive flag 167 is enabled, the PWM signal can be output.

The start-up drive setting 162, the contrast setting value 163, and the power-saving priority setting flag 164 stored in the BIOS-ROM 120 are developed from the BIOS-ROM 120 into the main memory 114 in a booting state.

The operating system 170 manages screen saver start time as a start screen saver session. The operating system 170 manages screen saver end time as a stop screen saver session.

An event notification module 172 of the operating system 170 has a function of notifying a package registered in an event notification setting 171 of a start screen saver event when the start screen saver session is started. The event notification module 172 has a function of notifying the package registered in the event notification setting 171 of a stop screen saver event when the screen saver is ended.

The utilities 160 have a function of registering a privacy filter control package 180 as a package which is notified of the start screen saver event and the stop screen saver event.

The privacy filter control package 180 has a function of controlling drive of the privacy filter 17 depending on a content of the conjunction drive setting 165 when the start screen saver event or the stop screen saver event is notified.

The privacy filter control package 180 has a function of detecting a start/stop of a set application depending on the content of the conjunction drive setting 165 to control drive of the privacy filter 17 depending on a detection result.

Figures 8, 11:
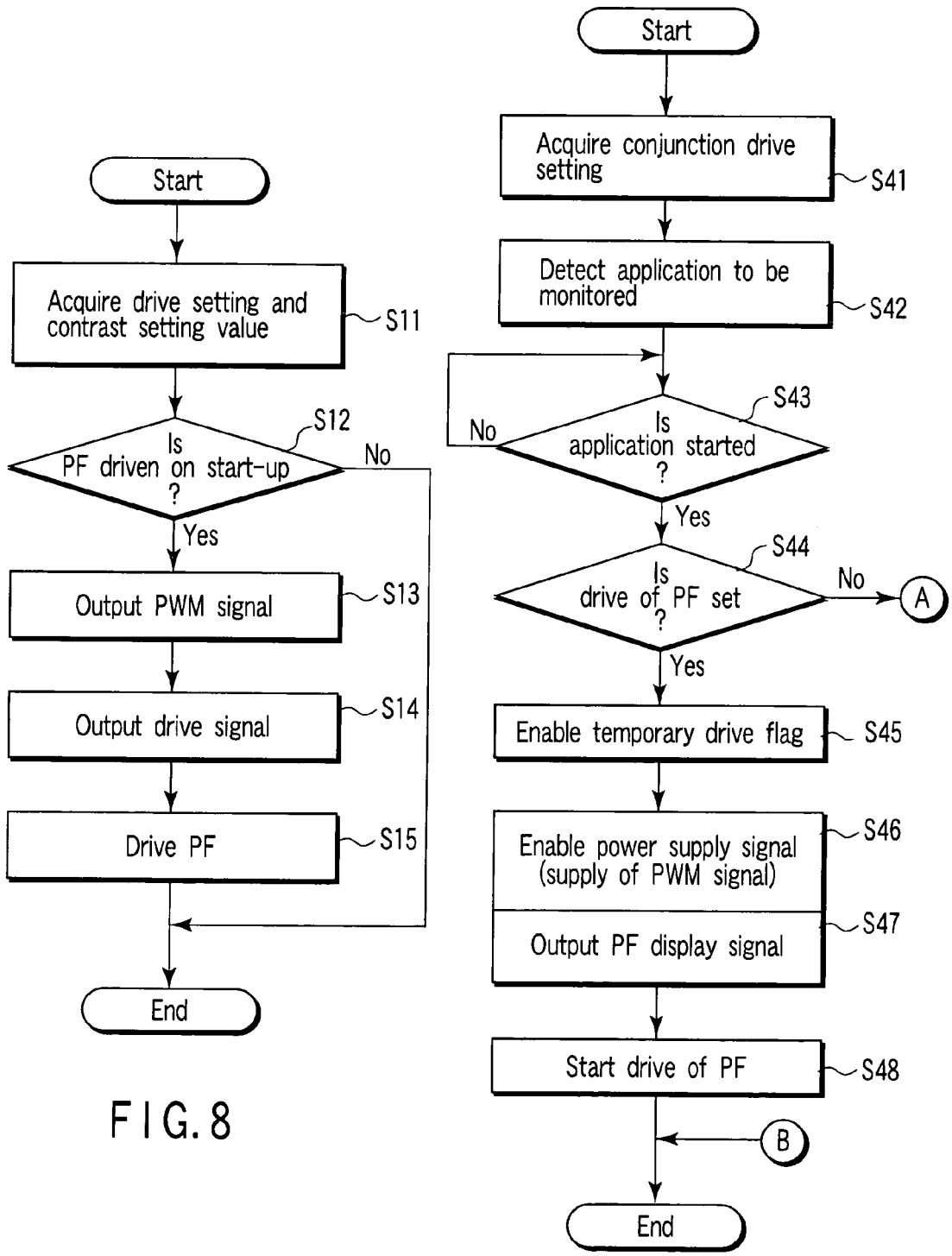
FIG. 8 is an exemplary flow chart showing a procedure of drive control of a privacy filter.
FIG. 11 is an exemplary flow chart showing a procedure by which control drive of the privacy filter can be performed at a start of an application.

A procedure by which drive control of the privacy filter 17 can be performed depending on the start-up drive setting 162 will be described below with reference to FIG. 8.

On start-up of the device, the start-up drive setting 162 and the contrast setting value 163 stored in the BIOS-ROM 120 are developed on the main memory 114. A power supply signal supplied from the embedded controller/keyboard controller IC 124 to the power supply 125 is enabled, a power is supplied from the power supply 125 to the privacy filter drive unit 140.

The embedded controller/keyboard controller IC 124 acquires the start-up drive setting 162 and the contrast setting value 163 (block S11). The embedded controller/keyboard controller IC 124 determines whether the privacy filter 17 is set to be determined on start-up of the device with reference to the start-up drive setting 162 (block S11).

When the privacy filter 17 is not set to be started on start-up of the device (No in block S12), the embedded controller/keyboard controller IC 124 does not start the privacy filter 17.

When the privacy filter 17 is set to be driven on start-up of the device (Yes in block S12), the embedded controller/keyboard controller IC 124 enables the privacy filter drive flag 161 to supply a PWM signal corresponding to the contrast setting value 163 to the power supply 125 (block S13). The power supply 125 supplies a drive signal corresponding to the PWM signal to the privacy filter 17 (block S14). When the drive signal is supplied, the privacy filter 17 is driven (block S15).

The processes described above end the drive control of the privacy filter 17 on start-up of the device. By the processes described above, the drive of the privacy filter 17 can be controlled depending on a setting of the start-up drive setting 162.

Figure 9:
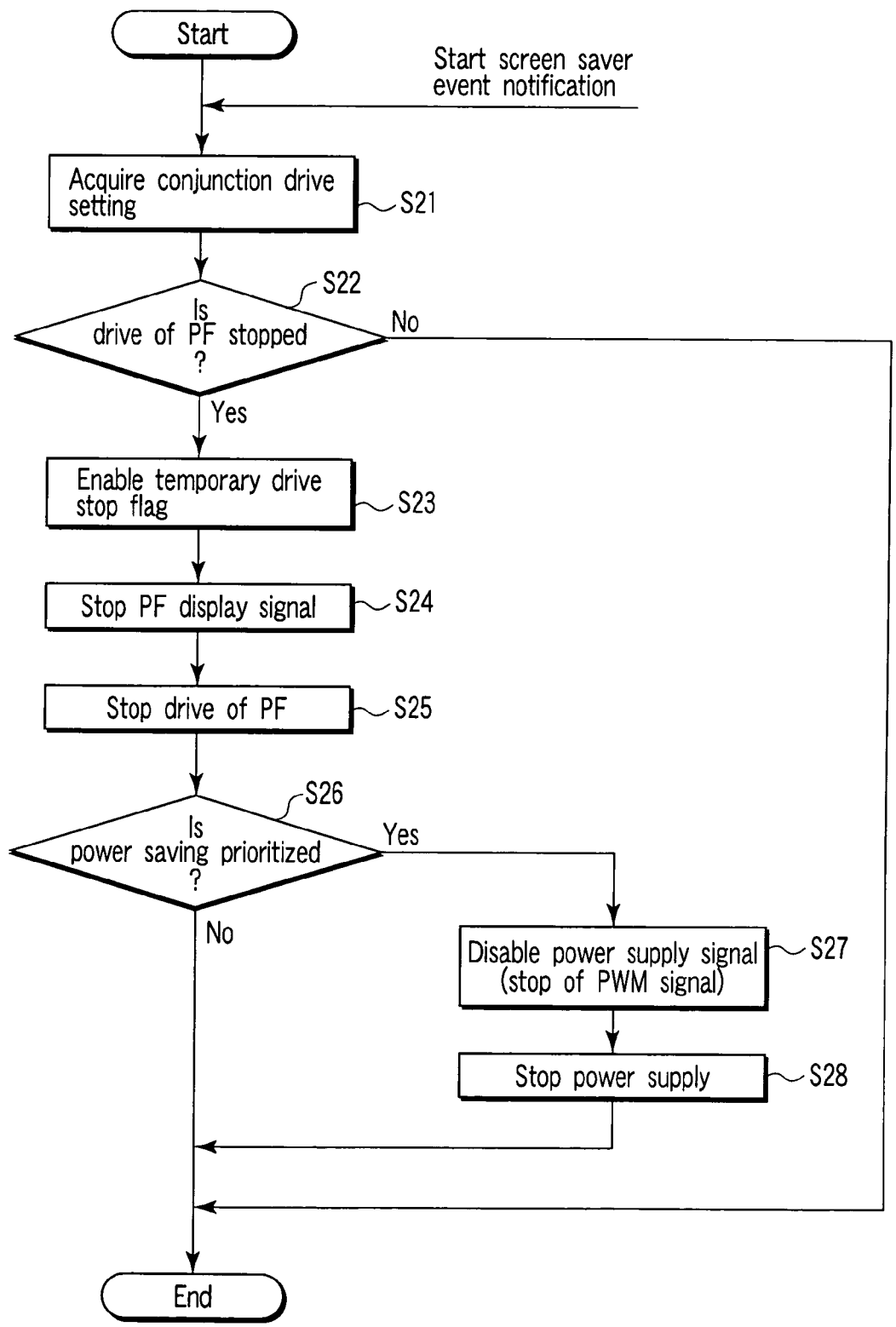
FIG. 9 is an exemplary flow chart showing a procedure by which drive control of the privacy filter can be performed at a start of a screen saver.

With reference to FIG. 9, a procedure by which drive control of the privacy filter 17 at a start of a screen saver can be performed depending on the conjunction drive setting 165 will be described below.

On start-up of the device, values of the start-up drive setting 162, the contrast setting value 163, and the power-saving priority setting flag 164 stored in the BIOS-ROM 120 are developed on the main memory 114. A power supply signal (PWM signal) supplied from the embedded controller/keyboard controller IC 124 to the power supply 125 is enabled, a power is supplied from the power supply 125 to the privacy filter drive unit 140.

When a start screen saver event is notified by the event notification module 172, the privacy filter control package 180 acquires the conjunction drive setting 165 (block S21).

The privacy filter control package 180 determines whether the conjunction drive setting 165 is a setting content which stops drive of the privacy filter 17 in conjunction with a start of the screen saver (block S22). When the conjunction drive setting 165 is the setting content which does not stop the drive of the privacy filter 17 (No in block S22), the privacy filter control package 180 ends a drive control process of the privacy filter 17. When the conjunction drive setting 165 is the setting content which stops the drive of the privacy filter 17 (Yes in block S22), the privacy filter control package 180 temporarily enables the temporary drive stop flag 166 (block S23).

The embedded controller/keyboard controller IC 124 which periodically detects a state of the temporary drive stop flag 166 detects that the temporary drive stop flag 166 is enabled to stop an output of a PF display ON signal (block S24). When the supply of the PWM signal is stopped, the privacy filter drive unit 140 stops the supply of the drive signal to the privacy filter 17 to stop the drive of the privacy filter 17 (block S25).

The embedded controller/keyboard controller IC 124 determines whether power saving is prioritized with reference to the power-saving priority setting flag 164 (block S26). When the power-saving is not prioritized (No in block S26), the embedded controller/keyboard controller IC 124 ends the control process of the privacy filter 17 related to the start of the screen saver.

When the power saving is set to be prioritized (Yes in block S26), the embedded controller/keyboard controller IC 124 disables a power supply signal (PWW signal) supplied from the embedded controller/keyboard controller IC 124 to the power supply 125 to stop power supply from the power supply 125 to the privacy filter drive unit 140 in preference to the power saving (block S27). The power supply 125 stops power supply to the privacy filter drive unit 140 (block S28).

The processes described above make it possible to stop drive of the privacy filter 17 in conjunction with a start of the screen saver, so that power saving of the personal computer 10 can be achieved.

When the power saving is prioritized, the privacy filter drive unit 140 does not operate. For this reason, in comparison with a case in which only a PWM signal to the privacy filter drive unit 140 is stopped, a power consumption of the personal computer 10 can be reduced. In restoration, after a power is supplied to the privacy filter drive unit 140 to drive, a drive signal is supplied to the privacy filter 17. For this reason, restoration time is longer than that required when supply of only the PWM signal is stopped.

Figure 10:
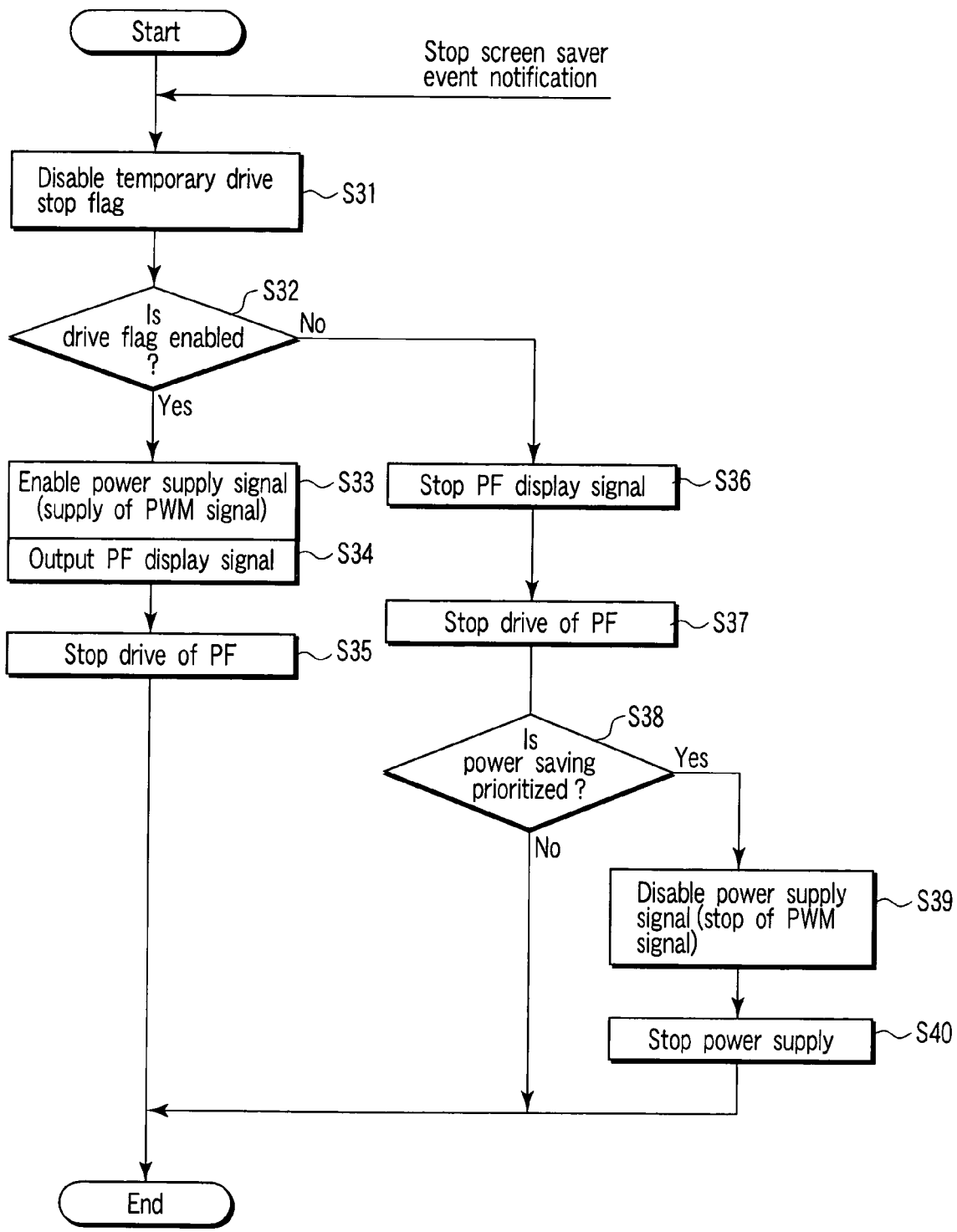
FIG. 10 is an exemplary flow chart showing a procedure when the screen saver is ended.

Processes performed when the screen saver is ended by operating the keyboard 20 or the like will be described below with reference to FIG. 10.

When a stop screen saver event is notified by the event notification module 172, the privacy filter control package 180 disables the temporary drive stop flag 166 on the main memory 114 (block S31).

The embedded controller/keyboard controller IC 124 refers to the privacy filter drive flag 161 to determine whether the drive flag 161 is enabled (block S32). When drive of the privacy filter 17 is controlled in conjunction with a start of an application, the control is performed by enabling one of the temporary drive stop flag 166 and the temporary drive flag 167, and the privacy filter drive flag 161 is not changed. Therefore, the privacy filter drive flag 161 has information of a drive state of the privacy filter 17 obtained before the drive of the privacy filter 17 is controlled in conjunction with the start of the application.

In block S32, when the privacy filter drive flag 161 is enabled (Yes in block S32), the embedded controller/keyboard controller IC 124 enables a power supply signal (PWM signal (block S33) to supply a PF display signal to the privacy filter drive unit 140 (block S34). When the PF display signal is supplied to cause the privacy filter drive unit 140 to supply a drive signal to the privacy filter 17, thereby turning on the privacy filter 17 (block S35).

In block S32, when the drive flag is disabled (No in block S32), the embedded controller/keyboard controller IC 124 stops the supply of the PF display signal to the privacy filter drive unit 140 (block S36). When the supply of the PF display signal is stopped, the privacy filter drive unit 140 stops supply of a drive signal to the privacy filter 17 to stop the drive of the privacy filter 17 (block S37).

The embedded controller/keyboard controller IC 124 refers to the power-saving priority setting flag 164 to determine whether power saving is prioritized (block S38). When the power saving is not prioritized (No in block S38), the embedded controller/keyboard controller IC 124 ends the control process of the privacy filter 17 related to a start of the screen saver.

When the power saving is set to be prioritized (Yes in block S38), the embedded controller/keyboard controller IC 124 disables a power supply signal (PWM signal) supplied from the embedded controller/keyboard controller IC 124 to the power supply 125 to stop power supply from the power supply 125 to the privacy filter drive unit 140 in preference to power saving (block S39). The power supply 125 stops power supply to the privacy filter drive unit 140 (block S40).

At a stop of drive of the screen saver, the processes described above can return the drive state of the privacy filter 17 to the state before the stop of drive of the screen saver.

Figure 12:
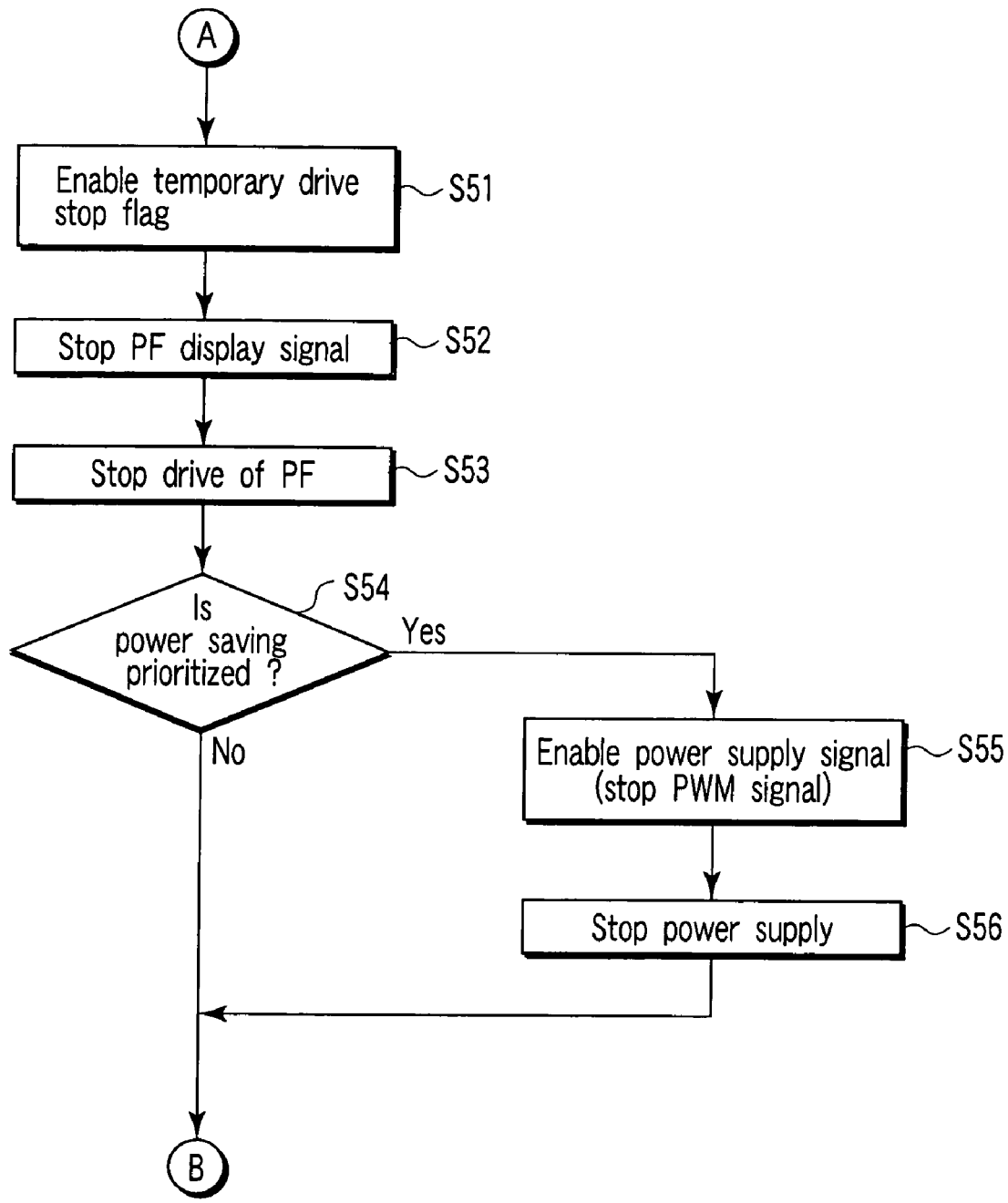
FIG. 12 is an exemplary flow chart showing a procedure by which drive control of the privacy filter can be performed at a start of the application.

A procedure by which drive control of the privacy filter 17 can be performed in conjunction with a start of a set application will be described below with reference to FIGS. 11 and 12.

The privacy filter control package 180 acquires the conjunction drive setting 165 (block ST41) to detect an application the start and end of which are monitored (block ST42). The privacy filter control package 180 detects whether the application detected in block ST42 is started (block ST43).

When the application is started (Yes in block ST43), the privacy filter control package 180 determines whether the privacy filter 17 is set to be driven in conjunction with a start of the application the start of which is detected (block S44).

When the privacy filter 17 is set to be driven (Yes in block S44), the privacy filter control package 180 enables a temporary drive flag (block S45).

The embedded controller/keyboard controller IC 124 which periodically detects a state of the temporary drive flag 167 detects that the temporary drive flag 167 is enabled to enable a power supply signal (PWM signal) (block S46), and supplies a PF display signal to the privacy filter drive unit 140 (block S47). The order of block S46 and block S47 may be reversed.

When a power is supplied from the power supply 125 to the privacy filter drive unit 140, a drive signal is supplied from the privacy filter drive unit 140 to the privacy filter 17 by supplying the PF display signal to drive the privacy filter 17 (block S48). When no power is supplied from the power supply 125 to the privacy filter drive unit 140, a PWM signal is supplied to the power supply 125 to set the privacy filter drive unit 140 in a movable state. A drive signal is supplied from the privacy filter drive unit 140 to the privacy filter 17 by supplying a PF display signal, and the privacy filter 17 is driven (block S48).

In block S44, when the privacy filter 17 is set to be stopped (No in block S44), the temporary drive stop flag 166 is enabled (block S51).

The embedded controller/keyboard controller IC 124 periodically detects a state of the temporary drive stop flag 166 detects that the temporary drive stop flag 166 is enabled to stop an output of the PF display signal (block S52). When the supply of the PF display signal is stopped, the privacy filter drive unit 140 stops the supply of the drive signal to the privacy filter 17 to stop the drive of the privacy filter 17 (block S53).

The embedded controller/keyboard controller IC 124 refers to the power-saving priority setting flag 164 to determine whether power saving is prioritized (block S54). When the power saving is not prioritized (No in block S54), the embedded controller/keyboard controller IC 124 ends the control process of the privacy filter 17 related to a start of the screen saver.

When the power saving is set to be prioritized (Yes in block S54), the embedded controller/keyboard controller IC 124 disables a power supply signal (PWM signal) supplied from the embedded controller/keyboard controller IC 124 to the power supply 125 to stop power supply from the power supply 125 to the privacy filter drive unit 140 in preference to power saving (block S55). The power supply 125 stops power supply to the privacy filter drive unit 140 (block S56).

The processes described above can drive the privacy filter 17 or stop the drive in conjunction with a start of the set application.

Figure 13:
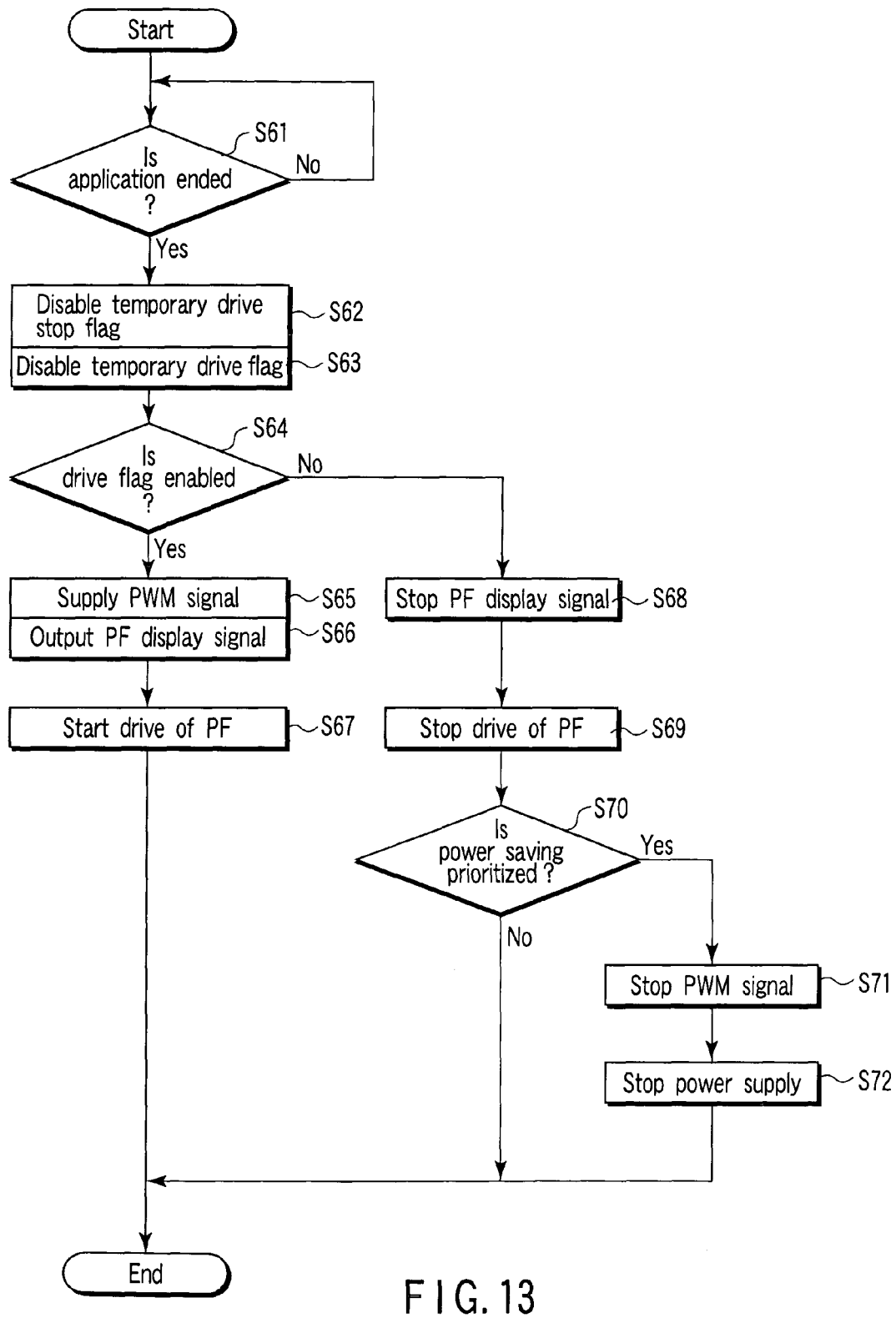
FIG. 13 is an exemplary flow chart showing a procedure by which drive control of the privacy filter can be performed at an end of the application.

Processes performed when the application which controls the drive of the privacy filter 17 in conjunction with the start-up ends will be described below with reference to FIG. 13.

An end of the application is monitored (block S61). When the application is ended (Yes in block S61), the privacy filter control package 180 disables the temporary drive stop flag (block S62) and disables the temporary drive flag (block S63).

The embedded controller/keyboard controller IC 124 refers to the privacy filter drive flag 161 to determine whether the drive flag 161 is enabled (block S64). When the drive of the privacy filter 17 is controlled in conjunction with the start of the application, one of the temporary drive stop flag 166 and the temporary drive flag 167 is enabled, and the privacy filter drive flag 161 is not changed. Therefore, the privacy filter drive flag 161 has information of a drive state of the privacy filter 17 obtained before the drive of the privacy filter 17 is controlled in conjunction with the start of the application.

In block S64, when the privacy filter drive flag 161 is enabled (Yes block S64), the embedded controller/keyboard controller IC 124 enables a power supply signal (PWM signal) (block S65) to supply a PF display signal to the privacy filter drive unit 140 (block S66). When the PF display signal is supplied to the privacy filter drive unit 140, the privacy filter drive unit 140 supplies a drive signal to the privacy filter 17 to drive the privacy filter 17 (block S67).

In block S64, when the drive flag is disabled (No in block S64), the embedded controller/keyboard controller IC 124 stops the supply of the PF display signal to the privacy filter drive unit 140 (block S68). When the supply of the PF display signal is stopped, the privacy filter drive unit 140 stops the supply of the drive signal to the privacy filter 17 to stop the drive of the privacy filter 17 (block S69).

The embedded controller/keyboard controller IC 124 refers to the power-saving priority setting flag 164 to determine whether power saving is prioritized (block S70). When the power saving is not prioritized (No in block S70), the embedded controller/keyboard controller IC 124 ends the control process of the privacy filter 17 related to a start of the screen saver.

When the power saving is set to be prioritized (Yes in block S70), the embedded controller/keyboard controller IC 124 disables a power supply signal (PWM signal) supplied from the embedded controller/keyboard controller IC 124 to the power supply 125 to stop power supply from the power supply 125 to the privacy filter drive unit 140 in preference to power saving (block S71). The power supply 125 stops power supply to the privacy filter drive unit 140 (block S72).

With the processes described above, when the drive of the privacy filter 17 is controlled in conjunction with the start of the application, at the end of the application, the drive state of the privacy filter 17 can be returned to a state before the application is driven.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing device comprising:
   a display panel;
   a filter arranged to face one surface of the display panel and driven by a drive signal;
   a detecting module configured to detect a start and an end of an application;
   a drive controller configured to control the drive signal supplied to the filter;
   a power source configured to supply the drive signal having a value depending on signal value information to the drive controller;
   a signal value information supply module configured to supply the signal value information to the power source; and
   a filter controller configured to control turning on and turning off the filter depending on a detection result of the detecting module, and to cause the drive controller to stop supplying the drive signal to the filter in a state where the signal value information is kept supplied to the power source from the signal value information supply module, when the filter controller turns off the filter.

2. The information processing device of claim 1, further comprising:
   a body;
   a display module which has the display panel and the filter, which is supported by the body, which can be pivoted between a closing position where an upper surface of the body is covered and an opening position where the upper surface of the body is exposed; and
   an opening/closing detecting module configured to detect whether the display module is located at the closing position,
   wherein the filter controller is configured to turn off the display panel and the filter when the opening/closing detecting module detects that the display module is located at the closing position.

3. The information processing device according to claim 2, wherein the filter controller is configured to turn on the filter depending on a drive start of the display panel.

4. The information processing device of claim 3, wherein the filter controller is configured to turn on the filter in a case including at least one of power on and restoration from a resume state.

5. The information processing device of claim 1, wherein the filter controls an amount of light directing in a predetermined direction except for a nearly normal-line direction of a surface of the display panel depending on a value of the drive signal.

6. The information processing device according to claim 1, further comprising:
   the filter controller configured to cause the signal value information supply module supplying signal value information to stop supplying the drive signal from the power source to drive controller to the power source, when the filter is turned off.

7. An information processing device comprising:
a display panel;
a filter arranged to face one surface of the display panel and driven by a drive signal;
a drive controller to control the drive signal supplied to the filter;
a power source to supply the drive signal having a value depending on signal value information to the drive controller;
a signal value information supply module to supply the signal value information to the power source; and
a filter controller to control turning on and turning off the filter, and to cause the drive controller to stop supplying the drive signal to the filter in a state where the signal value information is kept supplied to the power source from the signal value information supply module when the filter controller turns off the filter.

8. The information processing device of claim 7, further comprising:
a body;
a display module which has the display panel and the filter, the display module being supported by the body and configured to be pivoted between a closing position where an upper surface of the body is covered and an opening position where the upper surface of the body is exposed; and
an opening/closing detecting module to detect whether the display module is located at the closing position,
wherein the filter controller is to turn off the display panel and the filter when the opening/closing detecting module detects that the display module is located at the closing position.

9. The information processing device according to claim 8, wherein the filter controller is to turn on the filter depending on a drive start of the display panel.

10. The information processing device of claim 9, wherein the filter controller is to-turn on the filter in a case including at least one of power on and restoration from a resume state.

11. The information processing device of claim 7, wherein the filter is to control an amount of light directing in a predetermined direction except for a nearly normal-line direction of a surface of the display panel depending on a value of the drive signal.

12. The information processing device according to claim 7, further comprising:
the filter controller to cause the signal value information supply module supplying signal value information to stop supplying the drive signal from the power source to the drive controller, when the filter is turned off.

* * * * *